Dec. 5, 1933.  E. WATSON  1,938,473
DIE FORMING APPARATUS FOR LARGE SHEETS OF MATERIAL
Filed April 11, 1932  8 Sheets-Sheet 1

Fig. 1.

Inventor,
Edgar Watson.

By Sturtevant, Mason & Porter
Attorneys

Inventor,
Edgar Watson.

Dec. 5, 1933.  E. WATSON  1,938,473
DIE FORMING APPARATUS FOR LARGE SHEETS OF MATERIAL
Filed April 11, 1932  8 Sheets-Sheet 7

Inventor,
Edgar Watson.
By
Attorneys.

Patented Dec. 5, 1933

1,938,473

UNITED STATES PATENT OFFICE 1,938,473

DIE FORMING APPARATUS FOR LARGE SHEETS OF MATERIAL

Edgar Watson, Towson, Md., assignor to The Lafayette Company, Baltimore, Md., a corporation of Maryland Application April 11, 1932. Serial No. 604,603

15 Claims. (Cl. 93—58)

This invention relates to a die forming apparatus which is particularly advantageous in the forming of large sheets of fiber board material such as are employed in making the fiber board containers of the type described in United States Letters Patent No. 1,774,299, and in my copending applications Serial No. 587,545 and Serial No. 587,546. In forming these blanks, it is necessary to trim the edges of the material to a predetermined size, and also to form therein score lines and cutting lines in directions extending parallel and diagonally to the edges of the sheet.

An illustrative form of construction of a machine with associated parts is set out on the accompanying drawings by way of example.

Figure 1:
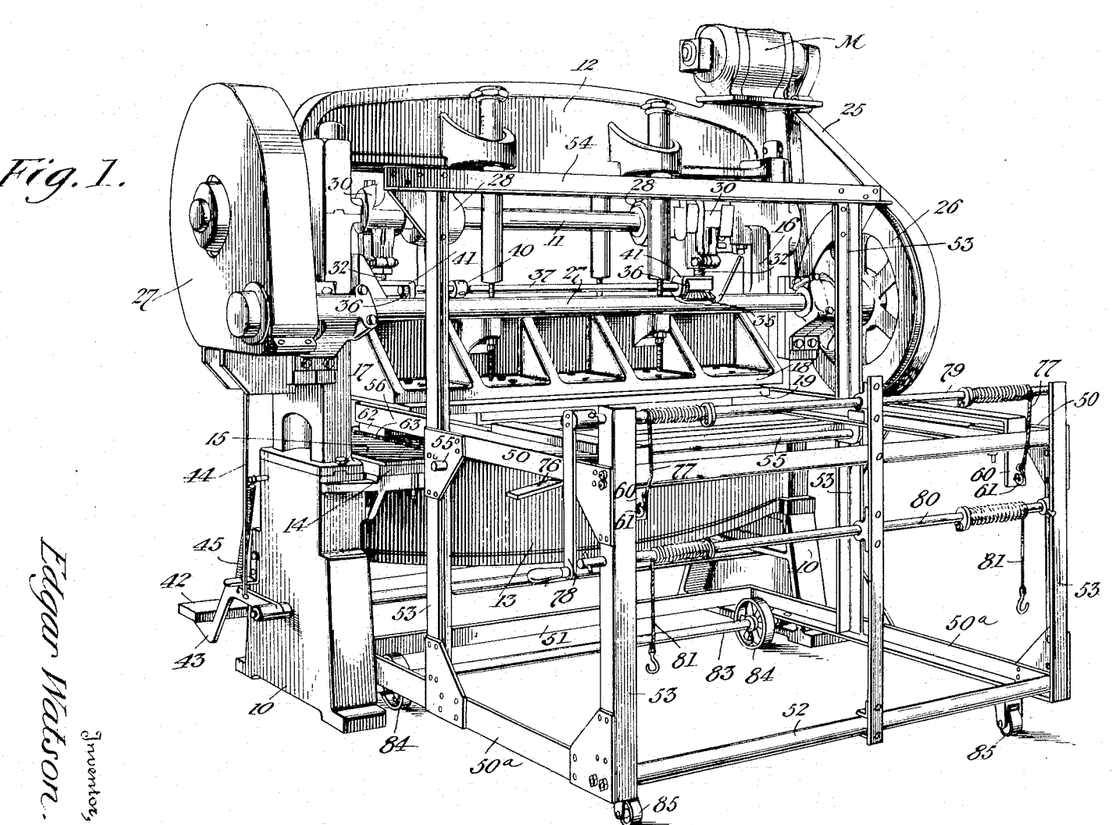
Figure 1 is a perspective view of the machine with associated apparatus, seen from the delivery end.
Figure 9:
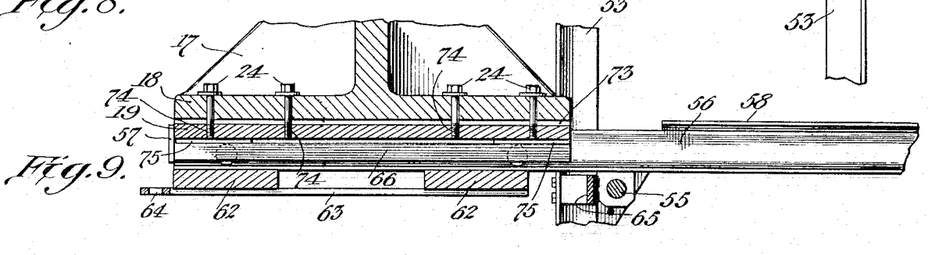
Fig. 9 is a corresponding view, showing the dolly beneath the press ram.

The cutting machine proper (Fig. 1) comprises the standards 10 which extend upwardly and support the bearings for the crank shaft 11 and are joined at their tops by a cross rail 12. Near their bottoms, the standards are joined by cross rails 13 (Fig. 2) which support the bed plate 14 at their tops. A thin flat metal make-up plate 15 is positioned upon the bed plate 14. The standards 10 are also provided with guides 16 at their inner faces for holding a reciprocating ram 17 in position for accurate vertical movement (Figs. 1 and 9). The ram 17 has a bottom plate 18 which supports the die plate 19 by bolts 24 (Fig. 9).

A driving motor M actuates a belt 25 for driving a fly-wheel 26 mounted on the transverse shaft 27 extending across the machine and having a driving relationship, preferably through a speed reducing gear (not shown) contained in the guard housing 27, for rotating the crank shaft 11, which is supported intermediate the standards 10 by suitable bearing members 28 of the upper cross rail 12. Near its ends the crank shaft 11 is provided with off-set cranks about which are located the eccentric straps 30 having split extension pieces for receiving the threaded ends 32 of connecting rods which are pivotally joined to the ram 17. The connecting rods 32 are provided with beveled gears 35 keyed thereto and operatively in mesh with beveled gears 36 carried by an adjusting shaft 37. The threads on connecting rods 32 at the two sides of the machine are preferably right and left hand, i. e. one has a right hand thread and the other a left hand thread, so that the two beveled gears 36 (Fig. 1) will serve upon the rotation of the adjusting shaft 37 to cause telescoping and collapsing of the crank connection assemblies simultaneously, whereby the position in height of the ram 17 may be varied at will. A collar 40 on adjusting shaft 37 may be turned by a spanner wrench for this purpose. The adjusting shaft 37 is preferably supported by brackets 41 carried by the connecting rods 32. A treadle bar 42 extending across the feeding end of the machine is connected to lever pieces 43 mounted on pivots of the machine frame, and connected by a draft link 44 with a one-stroke mechanism of any suitable type (not shown), whereby the crank shaft 11 is caused to make one complete revolution upon depression and release of the treadle bar 42. A return spring 45 is provided for the treadle bar and its levers.

The die plate 19 (Fig. 1) is illustrated as of such size that it extends substantially from one standard 10 to the other, and is of a width proportioned to the bottom plate 18 of the ram (Fig. 9). Preferably it is of considerable thickness, such as one inch, and hence is very weighty. It is provided with two systems of indicating marks, the first system H (Figs. 13, 14 and 15) comprises two sets of lines engraved on the plate at intervals of three-quarters of an inch and located at right angles to one another and parallel to the edges of the plate. The second system D of lines comprises two sets likewise engraved on the plate, and extending at right angles to one another but diagonally in respect to the edges of the die plate, i. e. at 45° thereto (Figs. 12-15) at intervals of one inch from one another. At the intersections of the first pluralities of lines are provided apertures 50 (Figs. 14 and 15) for the reception of securing means as described in detail hereinafter, these apertures thus being regularly spaced in each of these two directions which are at right angles to one another.

Since the machine is designed for cutting sheets of large size, it would be difficult to provide a machine having a die plate competent to cut simultaneously all four edges of and perform other operations upon a sheet of fiber board which may be 70 inches or more on a side. Therefore, it is preferred to have the die plate of sufficient size for accurately cutting one-half of the sheet, and then to reverse the sheet for cutting the other half. This means, however, that the cutting and scoring rules cannot be positioned upon the die plate so that the effort is uniformly distributed on either side of the axis thereof, unless care be taken in assembling the rules hereinafter referred to, to this end.

As shown in Figs. 12, and 14 to 25, operating rules for cutting and scoring are supported by angle members which may be provided as independent and self-contained furniture of different lengths and conformations and adapted for interfitting assembly with one another to provide cutting edges on the die plate at predetermined positions thereon.

Since the die plate is positioned with its cutting and scoring members downwardly directed in the machine, it is desirable to remove the die plate from the machine when the lay-out is to be changed. Owing to the great weight of the die plate and its members, and its location above the flat metal make-up plate 15, it cannot be handled directly by hand, and hence a device has been provided according to the present invention for removing and inserting the die plate and for presenting it in position for changing the lay-out.

This device is shown as comprising the longitudinal frame members 50, 50a of angle iron, the lower members 50a being joined at the front by a transverse member 51 and at the rear by a tubular transverse member 52. Uprights 53 are provided which are joined together at either side by the upper longitudinal members 50. The central uprights 53 are carried upward a sufficient distance above the working surface to permit the frame (hereinafter described) to swing freely, and are provided above such frame with a transverse stiffening piece 54. The angle members are suitably connected by gusset plates as shown, to assure proper stiffness to the structure.

Figures 7, 8, 10, 11:
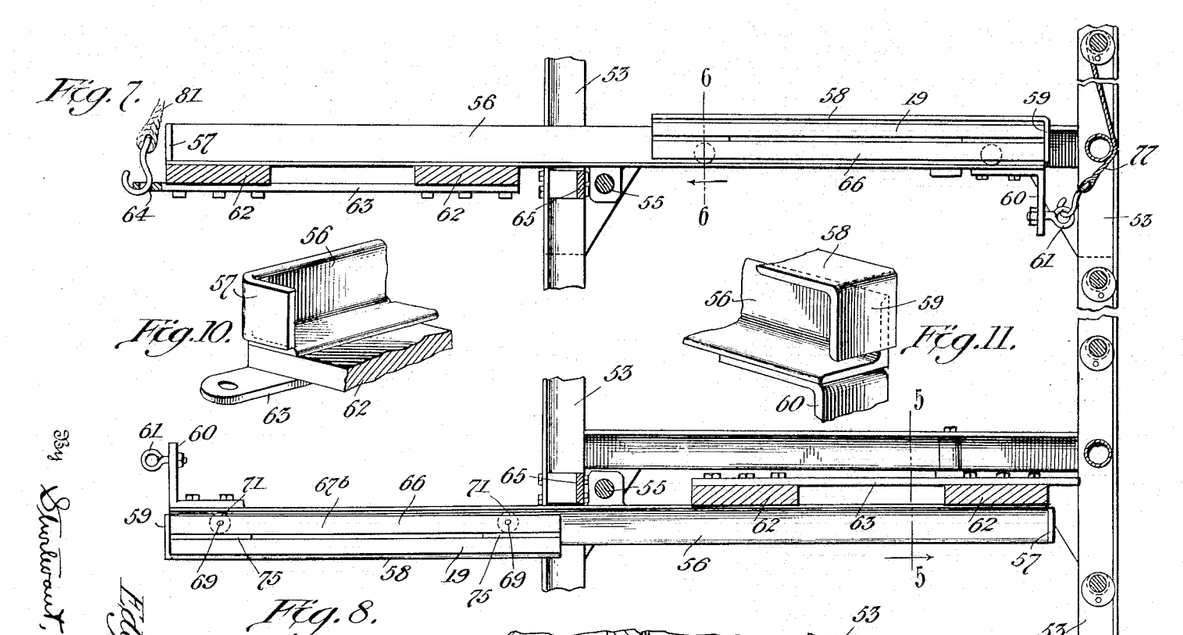
Fig. 7 is a fragmentary vertical sectional view substantially on line 7—7 of Fig. 2.
Fig. 8 is a view corresponding to Fig. 7, but showing the swinging frame in a reversed position.
Fig. 10 is a detail perspective view, showing one end of a rail of the swinging frame.
Fig. 11 is a detail perspective view, showing the other end of the rail.

The gusset plate for connecting the central standards 53 and the upper longitudinal members 50 receives the pivot shaft 55 of a swinging frame. This frame comprises at each side of the machine an angle member 56 which is more than twice as long as the width of the die plate 19, and is provided at one end with a rebent stop portion 57, and at the other end with a cover angle 58 forming with the angle iron 56 a channel for the reception and retention of the die plate during swinging movement of the frame (Figs. 7 and 8). The angle member 58 has an extension 59 forming a stop, and serves to retain the die plate within the aforesaid channel during the swinging movement of the frame. Projecting brackets 60 support eyes 61 for the cable connections which will be described in detail hereinafter.

The ends of the angle rails 56, which are not provided with the cover angle 58, are connected transversely of the frame by the bars 62 which support the die straps 63 having eyes 64 at their ends for connection with further cables as will be described hereinafter. Likewise, to stiffen the relatively stationary structure, transverse bars 65 extend between the central posts 53 thereof.

Figures 2, 3, 4, 5, 6:
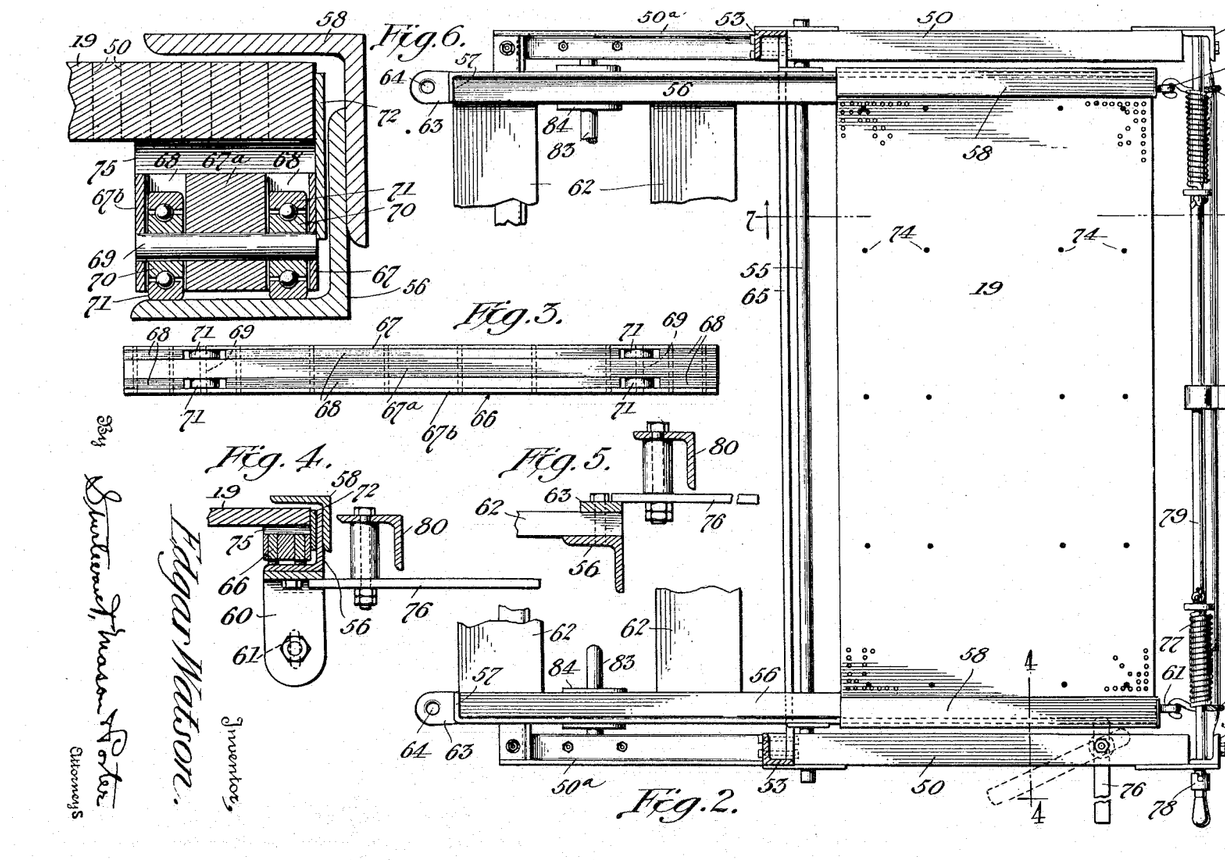
Fig. 2 is a horizontal sectional view through the device for supporting and shifting the die plate.
Fig. 3 is a top plan view of a dolly for supporting the plate in its translatory movement.
Fig. 4 is a fragmentary section, on a somewhat larger scale, substantially on line 4—4 of Fig. 2.
Fig. 5 is a similar view, substantially on line 5—5 of Fig. 8.
Fig. 6 is a fragmentary section, on a still larger scale, substantially on line 6—6 of Fig. 7.

Slidable on the angle irons 56 are two dollies 66 which are each comprised (Fig. 3) of three iron straps 67, 67a, 67b, spaced apart but secured together with fillers 68 located in the spaces therebetween (Figs. 3, 4 and 6). Through these irons pass the shafts 69 upon which are mounted the inner races 70 for a pair of ball bearings on each shaft around which may rotate the outer bearing races 71 operative as supporting rollers for the dollies. The two dollies are independent of one another. On each dolly is mounted a margin plate 72 extending upwardly above the tops of the dollies and serving to engage the lateral edge of the die plate 19 (Figs. 4 and 6) and cooperate therewith to prevent the dollies from disengagement from the angle members 56.

Figure 15:
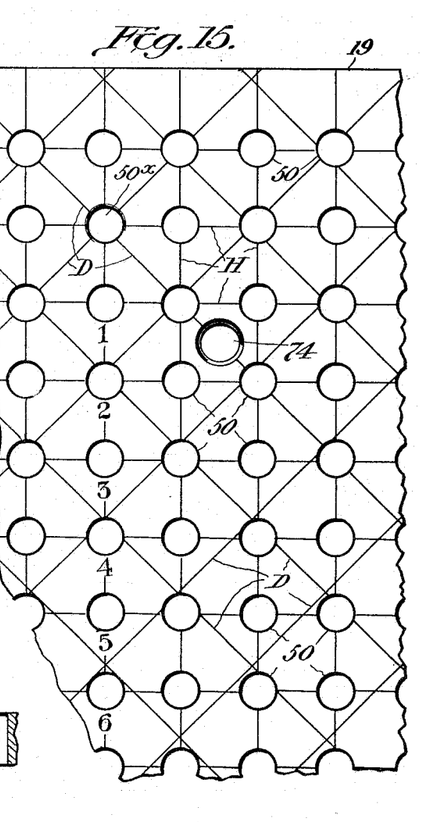
Fig. 15 is a view of the same, on a larger scale, showing the means of locating and securing angle members thereon.

The die plate is normally secured to the bottom plate 18 of the ram by bolts 24 passing through the bottom plate 18, past spacing bars 73, and into threaded apertures 74 in the die plate 19 (Figs. 2, 9 and 15). By withdrawing these bolts 24, the die plate is lowered upon the plates 75 fastened to the tops of the dollies when the latter are in position beneath the die plate (Fig. 9). The dollies with the die plate thereon may then be rolled toward the right (into position of Fig. 7) until the die plate and dollies are located beneath the angle member 58, being stopped in movement by the downward extensions 59 thereof. The swinging frame is held in this position by a manually operable detent 76 (Figs. 1 and 4), during the sliding movement. The device as a whole is then moved away from the machine, the detent 76 is released, and the swinging frame permitted to move in a clockwise direction (Fig. 7), under the action of gravity by reason of the weight of the die plate, until it is in a substantially vertical position, the detent being released to permit this. The cables 77 connected to eye members 61 is paid out by manually controlling the movement of the crank 78 on the shaft 79 serving as a windlass for the cables 77. Crank 78 is then placed on the end of windlass shaft 80 with the cables 81 on this windlass engaged with the eyes 64 at the opposite end of rails 56 and bars 64 (now located closely beneath the upper angle 54), and the cables 81 are drawn to pull the frame down to horizontal position again, but this time with the die plate reversed, so that the lay-out can readily be changed (Fig. 8). In this position, the detent 76 may then again be engaged to hold the angle members 56 from swinging (Figs. 5 and 8). It will be noted (Fig. 8) that the die plate 19 is supported by the angle members 58 when in this position.

After the lay-out has been changed as desired, the detent 76 is again released and the counter-clockwise swinging movement of the frame permitted to occur by slowly permitting the rotation of the windlass shaft 80. When the device has again reached substantially the vertical position, the crank handle 78 is removed from the windlass shaft 80 and again placed on the windlass shaft 79 and the latter is rotated to pull cables 77 which are attached to the eyes 61 on the brackets 60, and thus the angle members 56 may be returned to the original horizontal position of Fig. 7. The device is then moved to reintroduce the die plate 19 beneath the bottom plate 18 of the ram (Fig. 9), and the bars 73 and bolts 24 are inserted for bringing the die plate into fixed engagement with the bottom plate 18.

The carriage and its frame are then withdrawn and the die machine is ready for further operation.

Preferably the carriage is mounted on a shaft 83 having rollers 84, and on casters 85, so that it may be freely moved to and from the die machine.

Figures 12, 21, 22, 23:
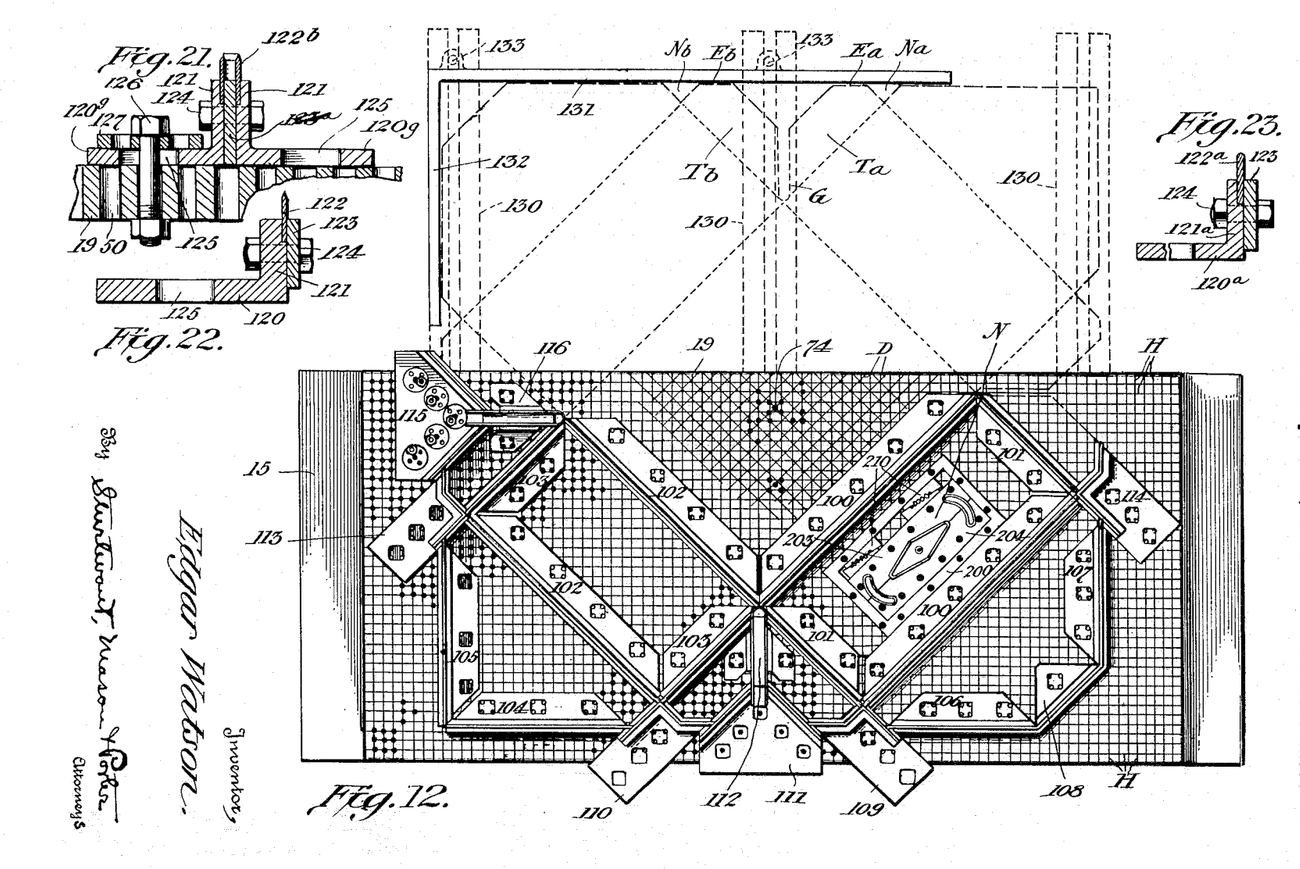
Fig. 12 is a plan view of the die plate, with associated parts, in reversed position.
Fig. 21 is a vertical sectional view substantially on line 21—21 of Fig. 20.
Fig. 22 is a similar sectional view substantially on line 22—22 of Fig. 20.
Fig. 23 is a similar view substantially on line 23—23 of Fig. 20.
Figure 13:
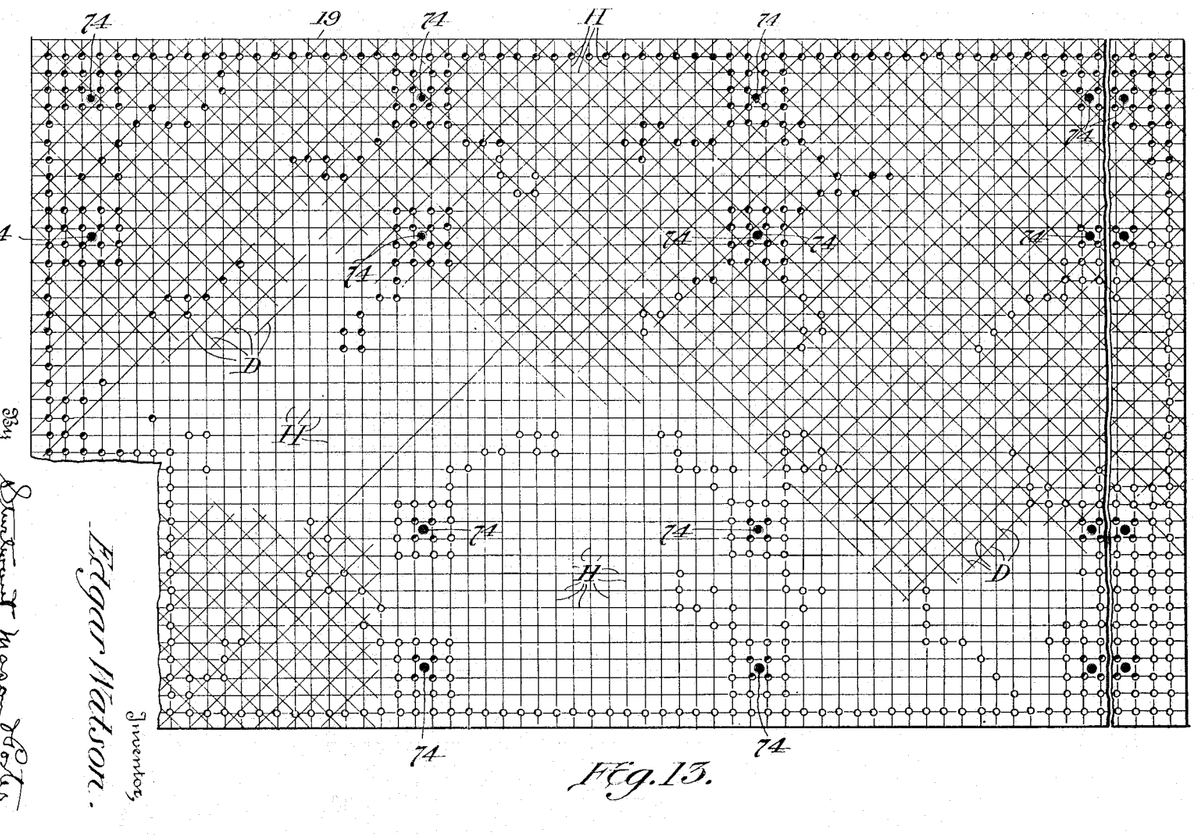
Fig. 13 is a view of the same, on a larger scale, showing the arrangement of the holes and marking lines thereof.

In Figure 12 is shown a lay-out of parts for cutting one-half of a large sized blank. Owing to the great size of a press, with the necessary ram and bed plate required for cutting all four sides of a sheet, and for performing the face operations thereon, the presently described arrangement has the advantage of the lesser dimensions required and the correspondingly lesser weight of parts to be handled and moved in operation.

In Figure 12 the face plate 19 is shown in reversed position, and the indicating lines H parallel to the edges of the plate are shown throughout its surface, while the diagonal indicating lines D are shown (for reasons of clearness) for only a fraction of the surface, although it will be understood that these lines are continued throughout the face of the plate 19. On this die plate 19 have been positioned pluralities of angle members as will be described hereinafter, forming a pattern by which one-half of a blank may be cut and scored in the desired manner. The clamping means for most of these individual members have been omitted, to indicate the manner in which the parts are laid out on the die plate before being clamped thereto. The members are shown as constituting parts of a set of "furniture" which may be provided in any desired number, and of different predetermined lengths and conformations so that lay-outs may be quickly assembled for any desired size of cut container blank. The furniture is shown as including individual angle members of different dimensions and conformations corresponding to the purpose for which they are employed. The angle members 100 are arranged parallel to one another and diagonally to the die plate, and are scoring devices of the type shown in section in Figure 23, and are of lengths corresponding to the lengths of the sides of the container to be made, and are spaced apart by distances equivalent to the heights of these sides. They have pluralities of openings, shown as substantially square but with rounded corners (Figs. 14 and 20) so that each opening has an area substantially of the dimensions and shape of four adjacent die plate apertures and the die plate area therebetween. Between these are located similar angle members 101 which are of lengths equivalent to the height of such sides. Thus the four angle members 100, 101 enclose a rectangle of the area required for producing a side of the container. Likewise, the angle members 102 are of lengths equivalent to the corresponding dimension of the end of the container and with the angle members 103 form a corresponding rectangle. The members 102, 103 are likewise scoring devices as shown in Fig. 23.

The angle members 104, 105 are arranged at right angles to one another and parallel to the edges of the die plate and have cutting rules to constitute cutting devices of the type shown in Fig. 22, and operate to form a right angle at one corner of the container blank by cutting away excess stock. Similarly, the angle members 106, 107 cut edges of the container blank adjacent a corner, but at this corner the blank is to be cut away on a line parallel to the angle members 100, and hence a separate angle member 108 joins the angle members 106, 107 for this purpose.

At the edge of the blank to be formed by the members at the lower part of Fig. 12, it is to be provided with two tabs and a gash corresponding to the tabs Ta and Tb and the gash G illustrated by the dotted and dash lines at the top of Fig. 12. For this purpose, the symmetrical angle members 109, 110 are provided, having cutting rules for forming the notches corresponding to notches Na and Nb at the top of Fig. 12 and the edges Ea and Eb thereat. Each of these members 109, 110 has a foot or bottom to rest against the die plate and upstanding rabbetted portions and clamping pieces for receiving and clamping a piece of operating rule 122 (Fig. 25), these upstanding portions being in three sections of which the middle section is at a right angle to one end section and at an obtuse angle to the other end section. It will be noted that the symmetrical members 109, 110 are respectively positioned closely to the angle members 106, 104. Between the symmetrical members 109, 110 is disposed an angle member 111 having cutting rules thereon arranged at right angles to one another whereby to form the edges of the tabs corresponding to Ta, Tb adjacent the notch therebetween. Within the space formed by the angle members 103, 111, 101 is provided an adjustable angle member 112 for supporting a U-shaped cutting rule for connecting a gash corresponding to gash G. This angle member 112 is located with a loop of the U-shaped rule 122b thereof close to the junction of the four angle members 100, 101, 102, 103 (Fig. 20), while the cutting rules of the angle member 111 are spaced apart so that the legs of the U-shaped cutting rule 122b may be received therebetween, and this relationship of the angle member 111 with respect to the angle members 101, 103 may be determined as desired.

Similarly, for the other two edges of the blank which are being trimmed in the same operation, are provided the symmetrical angle members 113, 114 which are identical in construction with the angle members 109, 110 and likewise form notches and adjacent edge portions of the container blank. The angle member 115 is likewise similar to the angle member 111. The angle member 115 is illustrated as secured to the die plate 19 by the matter described in detail hereinafter. A U-rule member 116 is identical in construction with the U-rule member 112.

Figures 20, 24, 25:
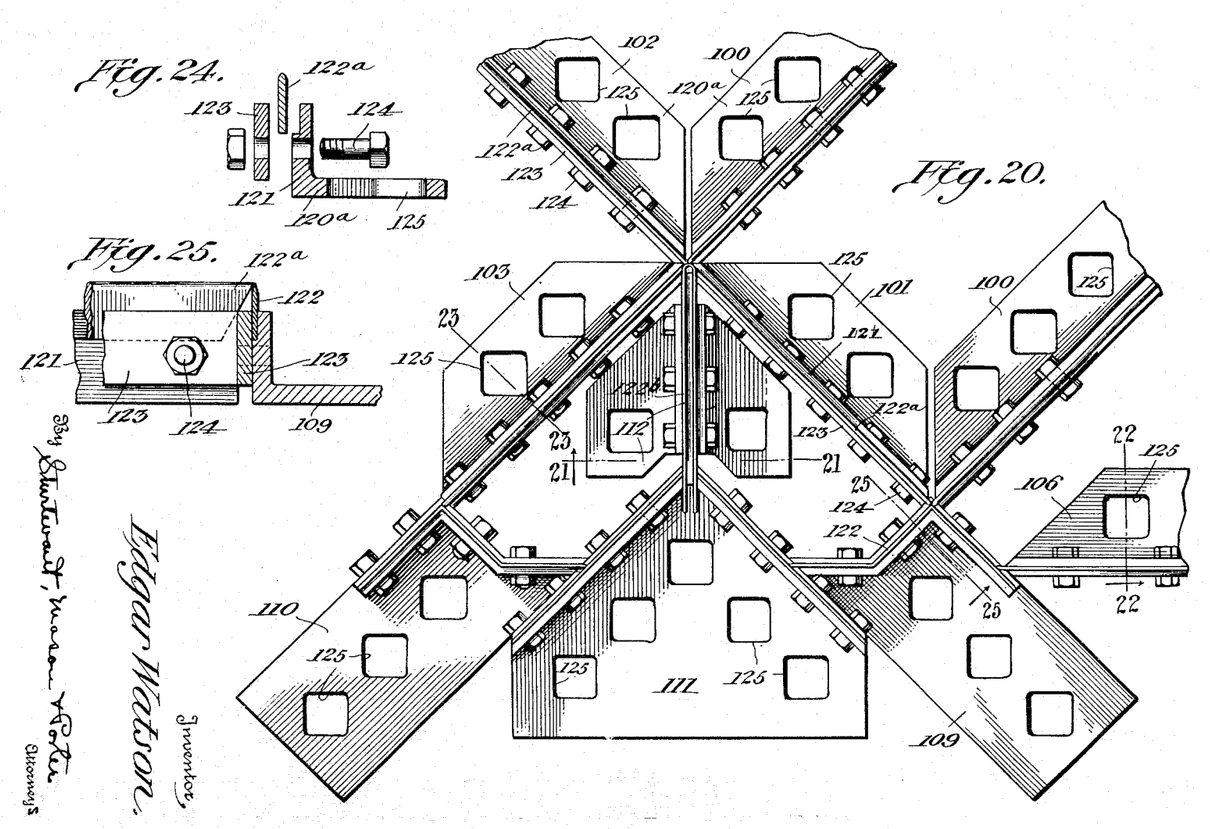
Fig. 20 is an enlarged view, showing a detail from Fig. 12, of an angle member assembly.
Fig. 24 is a view corresponding to that of Fig. 23, but indicating a dismounting of the component parts.
Fig. 25 is a section similar to Figures 21 to 23, substantially on line 25—25 of Fig. 20.

In Fig. 22 it will be seen that an angle member for cutting comprises a foot or bottom 120 having an upstanding portion 121 with a rabbet to receive a cutting rule 122 which is held in position by a plate 123 clamped by the bolts 124 (Figs. 20 and 22).

A similar structure for a scoring device is shown in Fig. 23 as comprising the foot or bottom 120a, with the upstanding portion 121a having a rabbet to receive a scoring rule 122a which is held in position and resting solidly against the angle member itself by a clamped plate 123 secured by bolts 124. It will be noted that the rabbet in each instance is of sufficient dimensions to receive the cutting or scoring rule. The method of assembling such a structure is indicated in Fig. 24, from which it will be seen that worn cutting or scoring rules may be removed and replaced, so that the furniture may be maintained at a high degree of efficiency.

From Figs. 12 and 20 it will be seen that it is preferred to provide the furniture with mitred ends so that the pieces may be closely approximated at the corners of the rectangles, etc. constituting the container blank. In order that the ends of cutting and scoring rules may operate close to the junctions of the scoring lines and corners of the blank, these rules are preferably themselves mitred with the long dimensions at the top, so that they may overlie or overhang the portions 121, 121a and the clamping plates 123 of adjacent members.

Figures 14, 16, 17:
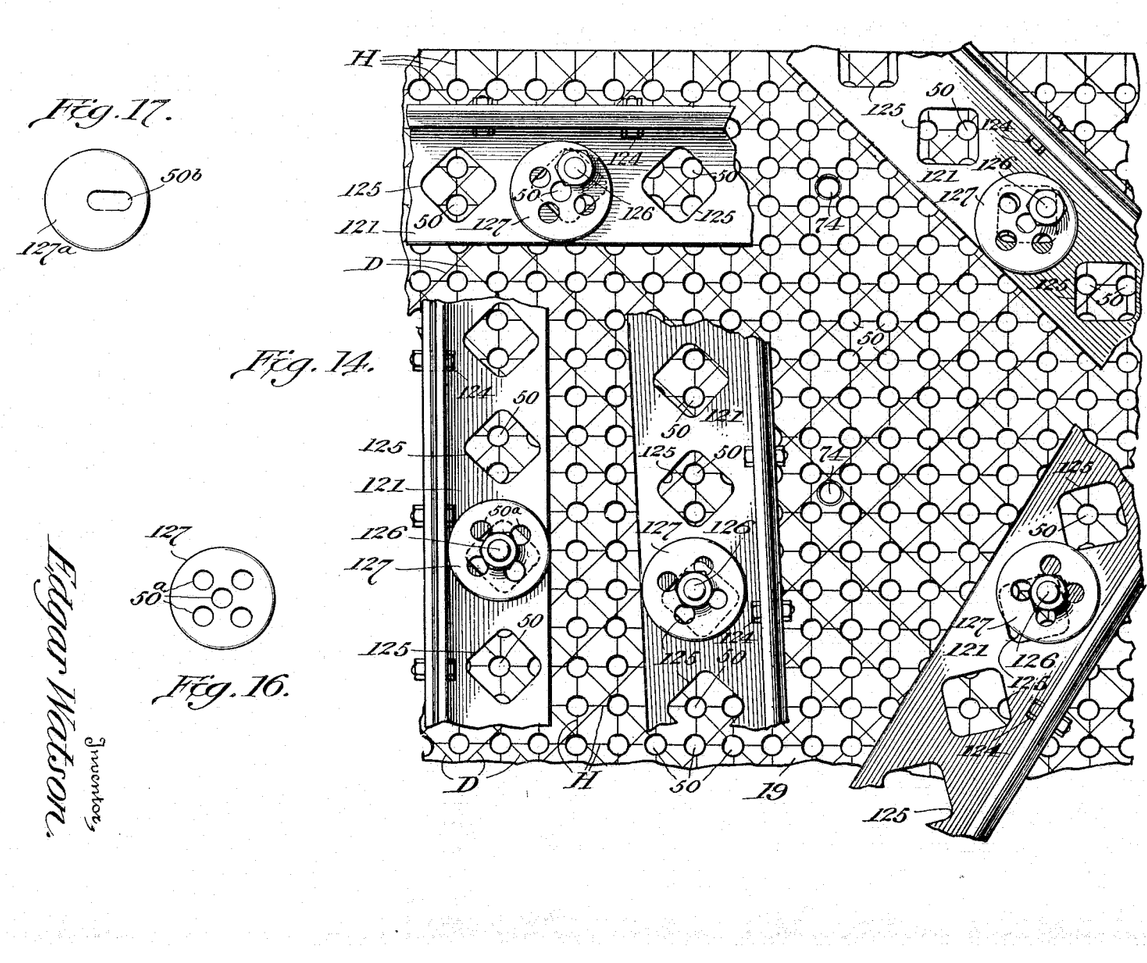
Fig. 14 is a fragmentary view, on a yet larger scale than that of Fig. 13, of a fragment of the die plate, showing various possible arrangements of angle members thereon, with the adaptability of the openings in said members and of the securing washers for fixing the angle members in such position.
Figs. 16 and 17 are detail views, on the same scale as Fig. 14, showing two forms of the securing washers for the angle members.

In Fig. 21 the U-rule member is shown to comprise two base pieces 120 having the upstanding rabbetted legs 121, which are separated by a filler piece 123a while the whole is clamped together and upon the rebent cutting rule 122b by the bolts 124. This figure likewise shows that the openings 125 of the base portions angle members are of larger dimension than the apertures in the die plate and the bolts 126 employed for clamping the angle members upon the base plate 19, so that a range of adjustment is permitted (Fig. 14) whereby the angle members may be located at any point and position on the plate. The bolts 126 operate through apertures of the clamping washers 127 which overlap the openings 125, and receive the bolts 126 in various positions regardless of the positions of the openings 125 with respect to the holes 50 in the die plate 19, so that a full range of adjustment is feasible. These washers 127 may be constructed in many ways. In Figs. 14 and 16 the washer 127 is shown to have five holes 50a disposed one at the center and the other four in pairs diametrically opposite one another and nearer the periphery of the disk and at the same three-quarters of an inch intervals as the die plate holes 50, so that the bolt 126 may be inserted through any hole of the washer 127 which may be aligned with a corresponding hole of the die plate 19. In Fig. 17, a modified form of washer 127a having a slot 50b extending radially from the center toward the periphery is provided, and it will be noted that this washer likewise may always be brought into registry with an opening 50 in the die plate 19. This capacity of the washers and angle members to adapt themselves to any desired position on the die plate 19 is illustrated in Fig. 14, in which it will be noted that the bolts 126 pass through various holes in the washers 127, through the openings 125 in the feet 121 of angle members, and into apertures of the die plate 19, so that the angle members may always be secured in a proper and desired position.

Figure 18:
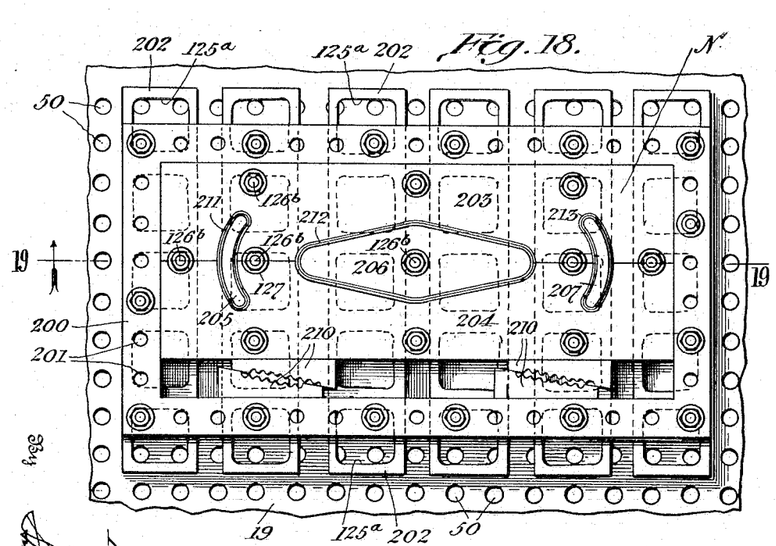
Fig. 18 is a plan view of a chase assembly for holding the scroll members in position.
Figure 19:
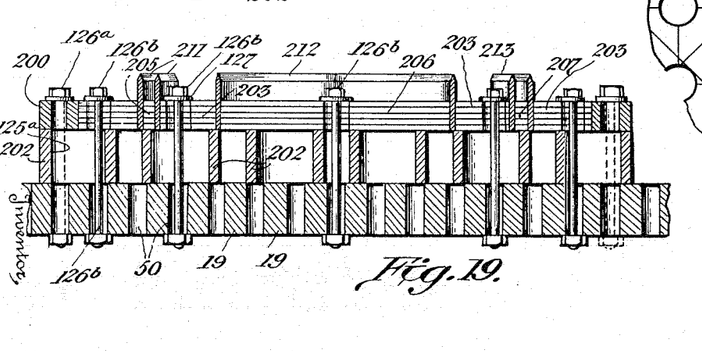
Fig. 19 is a sectional view of the same substantially on line 19—19 of Fig. 18.

In order to cut holes of various desired irregular patterns, it is preferred to incorporate, in a lay-out, a chase assembly as shown at N in Fig. 12, and shown in detail in Figs. 18 and 19, constituting a so-called "scroll" support for cutting rules. In Figs. 18 and 19 a rectangular open frame 200 has a plurality of apertures 201 therein, and rests upon the filler blocks 202 which are preferably provided with openings of the same general shape and size as the openings 125 shown in Figures 14 and 20. Bolts 126a pass through the apertures 201, the openings 125a, and a die plate for securing the chase frame fixedly in position. Scroll pieces 203, 204, 205, 206, 207 are formed by sawing a piece of ply wood into the desired shape, removing a sufficiency of stock for the reception of the cutting rule of standard thickness. Pieces of cutting rule are then bent to conform to these spaces and such pieces are then placed therein to provide the cutting rule scrolls 211, 212, 213. The larger pieces 203, 204, 206 of the scroll are provided with apertures of size larger than the holes 50 in the die plate, and are employed in conjunction with bolts 126b and washers 127 (Fig. 18) for holding these pieces directly to the die plate. The scroll pieces are held against lateral movement by quoins 210.

With the die plate in the position shown in Fig. 12, corresponding to that illustrated in Fig. 8, the operator can assemble a lay-out rapidly, and clamp the angle members in the predetermined positions. For the purpose of facilitating a rapid lay-out, one of the apertures 50 located near the middle of the length of the die plate has been designated as a center or reference aperture 50x (Fig. 15) and from it numerals are arranged on the die plate, as shown, but indicate the number of lines lying between a numeral and the selected holes. It will be noted that the aperture 50x likewise represents the common intersection of the two diagonal lines, so that angle members may be set up parallel to the diagonal lines and at definite distances from this hole, and are thus located in the lay-out at proper relationships to one another, by employment of standard lay-out charts which give the furniture pieces and their locations with respect to the reference aperture 50x whereby to align and balance the members with respect to the median axis of the die plate.

When the lay-out has been completed and clamped to the die plate, the latter may be returned to the machine for operation.

In this operation, guide members are provided for supporting the blank, and for engaging two edges thereof to assure proper registry of a blank while being operated on by the die plate and its angle members. Such supports are indicated by dotted lines at 130 in Fig. 12, while a rear stop gage bar 131 and a side gage bar 132 are likewise illustrated therein. Preferably, the gage bars are carried by the supports 130 and may be clamped thereto by screws 133. Thus, in operation, with the machine set up as shown in Fig. 1 and with the traveling carriage removed, the operator will push a blank into the machine and then draw it back and laterally until engaged with the gages 131, 132 while resting on the supports 130 and on the make-up plate 15. The treadle 42 is then depressed and the die plate then forms the inserted end in the blank in the desired manner. Subsequently, the sheet is turned end for end and the opposite end is formed in similar manner, and by the same die plate.

It has been found in practice that while other types of machines are not adapted to the cutting of large blanks of the nature herein described, with the diagonal lines of cutting and scoring necessary, the present machine rapidly and accurately performs the necessary operations within close limits of tolerance, so that the container blanks may be quickly and accurately assembled into containers of the desired size and shape.

It is obvious that the invention is not limited solely to the form of construction shown, but that it may be modified within many ways of the scope of the appended claims.

Having thus described the invention, what I claim as new and desire to secure by Letters Patent, is:

1. A die plate assembly for cutting and scoring large sheets of corrugated material, comprising an apertured die plate of greater dimension in one direction than the corresponding dimension of the sheet to be cut, and of lesser dimension than the sheet in the direction at a right angle to said first direction, a plurality of independent pieces of cutting and scoring furniture resting against said die plate and located thereon so that the center axis of effort during cutting and scoring substantially coincides with the longer and medial axis of the die plate, and means for securing the pieces of furniture to the die plate.

2. A die plate assembly for cutting and scoring operations on fiber material comprising a die plate having a plurality of apertures arranged at regular and uniform distances in directions at right angles to one another, a plurality of independent interfitting pieces of furniture each having a foot portion for resting against said die plate and an upstanding portion for removably supporting a piece of operating rule and including means for clamping said rule to said piece of furniture, said feet having openings therein larger than the apertures in said plate, washers of larger diameter than said openings, and threaded devices passing through said washers and openings and entering selected ones of said apertures for securing said pieces of furniture in any desired predetermined relationship upon said die plate.

3. A die plate assembly for cutting and scoring large sheets of corrugated material in directions parallel and at 45 degrees to edges of the sheet, comprising a die plate having a first system of equidistant indicating lines thereon in two sets at right angles to one another and parallel to edges of the plate, a second system of equidistant indicating lines thereon in two sets at right angles to one another and at 45 degrees to the edges of the plate, said plate being apertured at the intersections of said first indicating lines, one of said indicating lines in each set having a common point of intersection, whereby to provide a common reference point for the two systems of indicating lines, a plurality of independent pieces of rectilinear furniture each saving a foot resting against said die plate and each said foot having a plurality of openings of larger size than said apertures, said pieces being arranged parallel to one or another of said sets of indicating lines and at predetermined distances from said reference point, and means for securing said pieces of furniture to the die plate including washers of larger diameter than said openings and threaded devices passing through the washers, openings and apertures.

4. An apparatus for cutting and scoring fiber board including a press having a reciprocating die plate, said die plate being provided with a plurality of apertures regularly spaced in two directions at right angles to one another, interchangeable members each including feet for resting against the die plate, said feet having openings of dimensions corresponding to the spacing of said apertures so that each opening may lie opposite at least one said aperture, and means passing through said openings and entering selected apertures for holding the members in predetermined positions on said die plate, and cutting and scoring rules removably secured to said members.

5. An apparatus as in claim 4 in which the plate apertures are regularly arranged, and the openings in said members have areas not less than the combined area of four adjacent apertures and the die plate surface therebetween.

6. An apparatus as in claim 4 in which the apertures are regularly arranged at the corners of squares and said openings are quadrilaterals having the corners rounded with substantially the radius of the apertures, the centers of the rounded corners being spaced at substantially the same distances as the spacing of said apertures.

7. An apparatus as in claim 4 in which the apertures are regularly arranged and the members have openings larger than the apertures, and said holding means includes washers larger than said openings and being themselves apertured adjacent their centers and their peripheries to permit the securing of the members in any desired relation to the die plate, and threaded devices passing through said apertures and openings for holding said members to said die plate.

8. A die plate assembly of the class described for use with operating rules of standard heights, including a die plate, angle members each having feet and angular portions, means to hold the feet to the die plate, operating rules, rules clamps cooperating with said angular portions for supporting said rules thereon, securing devices passing through said angular portions and clamps to hold the same together and maintain said rules with their bottoms a predetermined distance from said die plate, filler members on said die plate, others of said rules resting against said filler members, scroll pieces for supporting said other rules, and clamping devices for holding said scroll pieces and fillers to said die plate, said filler members having the same height as said predetermined distance.

9. A die plate assembly of the class described including a die plate, a plurality of independent and self-contained angle members having feet and angular portions, means for securing said feet to the die plate, each of said angular portions being rabbetted for the thickness of an operating rule, operating rules in said rabbetted portions and resting solidly against the angle members, and clamping devices for holding said rules to said angle members.

10. An apparatus of the class described including interfitting pieces of furniture each being independent and self-contained end having an apertured foot to rest on a die plate and an upstanding rabbetted portion rigid with the foot, a clamping plate and means to secure the same to the rabbetted portion, and an operating rule held in said rebated portion by said clamping plate and resting solidly against the said piece of furniture.

11. An apparatus as in claim 10 in which the feet of two pieces of furniture have mitred ends so that the pieces may be arranged in juxtaposition at an angle to one another with the rabbetted portions thereof located closely adjacent one another, and the operating rules clamped to said pieces extend beyond the mitered ends of said pieces.

12. An apparatus as in claim 10 in which the operating rule of one of said pieces is cut away at one end opposite the operating edge thereof and said piece is positioned at an angle and closely juxtaposed to an intermediate portion of the length of another piece of furniture, said operating rule extending substantially into contact with the rule of said other piece of furniture.

13. In an apparatus of the class described, a piece of furniture comprising a pair of substantially symmetrical angle members each having apertured feet to rest on a die plate and upstanding portions, a spacing plate located between said upstanding portions, an operating rule of U-shape located with its legs at opposite sides of said spacing plate, and means to clamp said portions, rule and plate tightly together.

14. In an apparatus of the class described, an edge-notch-forming piece of furniture comprising an apertured foot and an upstanding rabbetted portion including three sections with the middle section at a right angle to one end section and at the obtuse angle to the other end sections, and means for clamping pieces of operating rule in the rabbets of said sections.

15. A die plate assembly of the class described including a die plate having a plurality of apertures in substantially regular arrangement on a surface of said plate, a plurality of elements each having a plurality of apertures each of size sufficient to extend over at least one of the plate apertures in any position of arrangement of the corresponding element upon the die plate, clamping means for securing said elements to said die plate and including means extending across apertures of said elements and having therein openings smaller than said apertures and securing devices passing through said openings and through coresponding apertures of said elements and die plate, and an operating rule held against movement along the surface of said die plate by at least one said element when clamped by the corresponding securing devices and extending means.

EDGAR WATSON.